United States Patent [19]

Blank et al.

[11] Patent Number: 5,615,064
[45] Date of Patent: Mar. 25, 1997

[54] PULSED CURRENT VELOCITY CONTROLLED HEAD LOAD METHOD AND APPARATUS WHICH USES THE BACK EMF TO CONTROL THE GENERATION OF HEAD ACTUATOR DRIVING PULSES

[75] Inventors: Timothy J. Blank, Byron; Kevin J. Erickson, Rochester; Richard Greenberg, Rochester; John C. Purkett, Rochester, all of Minn.

[73] Assignee: International Business Machines Corporation, Armonk, N.Y.

[21] Appl. No.: 317,979

[22] Filed: Oct. 3, 1994

[51] Int. Cl.$^6$ ............................................. G11B 21/02
[52] U.S. Cl. .............................. 360/75; 360/69; 360/105; 318/138
[58] Field of Search ...................... 318/138, 254, 318/439; 360/69, 75, 105, 78.04, 78.06, 78.01

[56] References Cited

U.S. PATENT DOCUMENTS

| | | | |
|---|---|---|---|
| 3,710,213 | 1/1973 | Hansen | 318/331 |
| 4,168,457 | 9/1979 | Rose | 318/361 |
| 4,480,218 | 10/1984 | Hair | 318/696 |
| 4,755,892 | 7/1988 | Carteau et al. | 360/75 |
| 4,786,994 | 11/1988 | Carteau et al. | 360/75 |
| 4,864,437 | 9/1989 | Couse et al. | 360/75 |
| 4,967,291 | 10/1990 | Touchton et al. | 360/78.04 |
| 5,016,121 | 5/1991 | Riddle et al. | 360/78.04 X |
| 5,231,549 | 7/1993 | Morehouse et al. | 360/75 |
| 5,430,362 | 7/1995 | Carr et al. | 318/779 |

FOREIGN PATENT DOCUMENTS

| | | | |
|---|---|---|---|
| 0524839 | 1/1993 | European Pat. Off. | |
| 0537916 | 4/1993 | European Pat. Off. | 360/75 |
| 60-151882 | 8/1985 | Japan | |
| 62107308 | 3/1989 | Japan | |

*Primary Examiner*—Andrew L. Sniezek
*Assistant Examiner*—Larry T. Cullen
*Attorney, Agent, or Firm*—Matthew J. Bussan; Homer L. Knearl; Francis A. Sirr

[57] ABSTRACT

A digital storage system is disclosed in which a flying read/write head is loaded onto the surface of moving storage media with controlled velocity to avoid contact with the surface of the storage media. Head load velocity is detected by measuring the back EMF generated by the head arm actuator. Improved control and accuracy is obtained by breaking up the head arm actuator drive power into a series of pulses and measuring the back EMF induced into the low impedance voice coil of the head arm actuator in between pulses but only after the actuator current has been reduced to substantially zero in order to avoid interference by actuator current induced voltages.

9 Claims, 6 Drawing Sheets

PULSED CURRENT VELOCITY CONTROLLED HEAD LOAD METHOD AND APPARATUS WHICH USES THE BACK EMF TO CONTROL THE GENERATION OF HEAD ACTUATOR DRIVING PULSES

BACKGROUND OF THE INVENTION

1. Field of the Invention

This invention relates to digital storage systems in which a flying read/write head is loaded onto the surface of moving storage media with controlled velocity to avoid contact with the surface of the storage media.

2. Description of the Related Art

The use of velocity control to load read/write heads onto the media of Direct Access Storage Devices (DASD) is known. U.S. Pat. No. 4,864,437 describes a head loading velocity control for use in a removable cartridge disk drive. First, a table of voltages at different actuator currents is generated with the actuator locked in a fixed position. Then the velocity is measured by monitoring the total voltage across the actuator, and subtracting the value in the table for the current flowing in the actuator coil. The remainder is treated as the back EMF generated in the coil by actuator motion. A problem with this method of measuring actuator velocity is that the back EMF voltage is more than an order of magnitude smaller than the voltage drops due to coil resistance and other effects. Therefore, any error in the table becomes magnified by the subtraction. Generating the table with the actuator rotor in a fixed position may give a different value of impedance due to circuit bias offsets, current levels and temperature changes.

U.S. Pat. No. 4,480,218 describes a position control system that uses the zero crossings of induced EMF to detect the detent positions of a two-phase stepper motor. In order to use a winding as both drive and position sensor, the current in the winding is reduced to zero before the detent position is reached. This prior art does not sense velocity.

U.S. Pat. No. 4,967,291 describes an over velocity detection system which measures velocity by integrating measured actuator coil current. The measurement is based on the assumption that acceleration is proportional to current and, therefore, the velocity should be proportional to integrated current. A difficulty with this method is that although the acceleration force may be proportional to current, the frictional forces are not constant and, therefore, current may not reflect actuator motion. That is because acceleration force must first overcome friction before the actuator begins to move.

U.S. Pat. No. 4,168,457 describes a method of controlling velocity using feedback signals from the rotating media. This method does not work for measuring head load velocity because the head can not receive feedback signals from the media before it has reached its flying height over the disk media.

SUMMARY OF THE INVENTION

These and other problems are substantially reduced by the present invention which provides for measuring the velocity by sensing back EMF from the voice coil motor during periods of time when the drive current to the motor has been turned off.

It is an advantage of the invention that the velocity may be more accurately measured in spite of the very low back EMF voltages induced in the voice coil winding.

It is a further advantage that accurate velocity sensing is accomplished without separate sense means or complex discrimination circuitry.

DETAILED DESCRIPTION OF A PREFERRED EMBODIMENT

Figure 1:
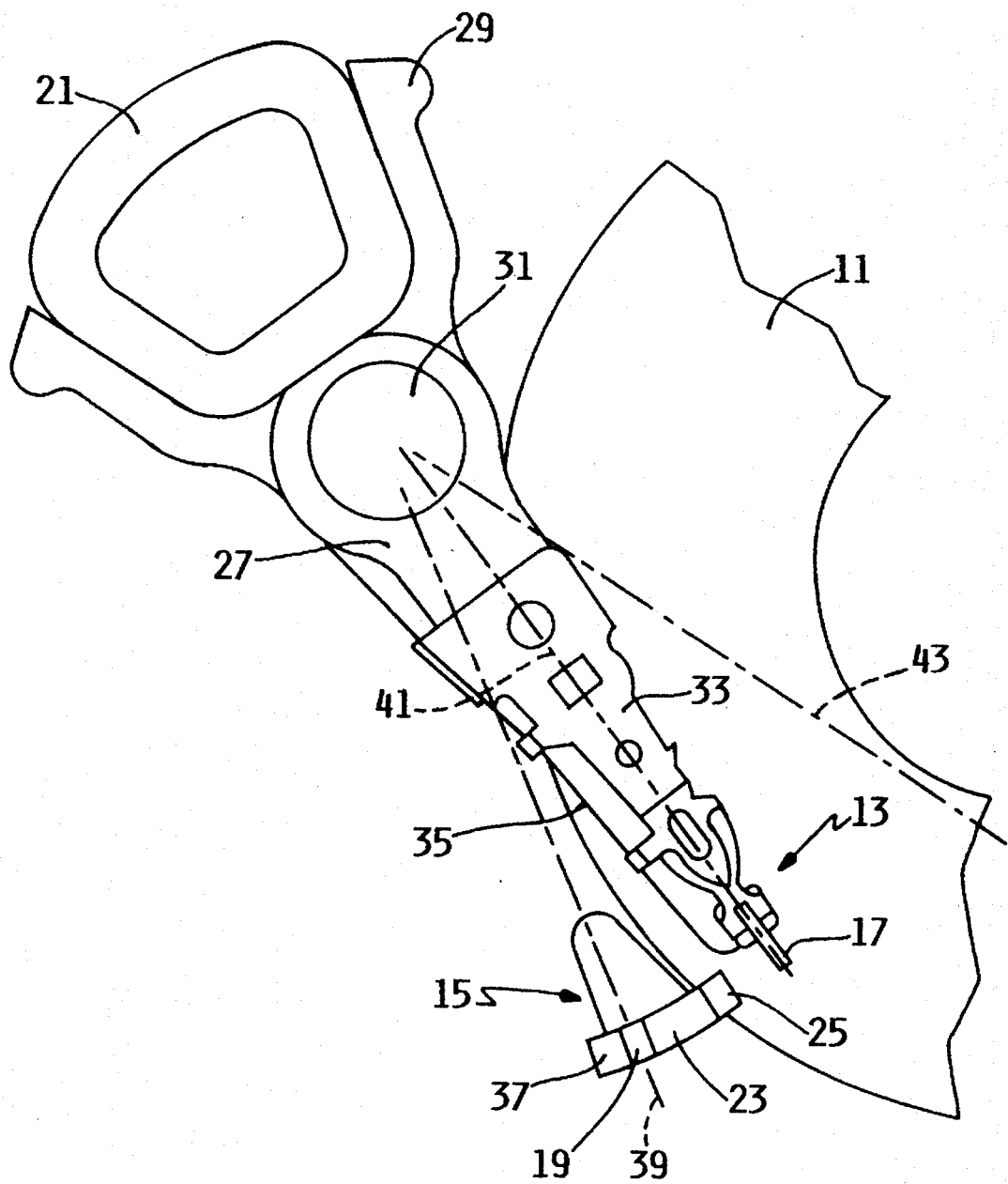
FIG. 1 is a top view of a disk memory media with the read/write head mounted on an actuator arm which is moved by a voice coil motor.

FIG. 1 shows the hardware portion of the invention in a simplified top view. A disk 11 is shown with a read write head 13 in position for reading or recording on the disk. Read write head 13 flys on a thin film of air just above the surface of the disk and must be placed or loaded onto this position over the disk in a precisely controlled manner in order to avoid contact with the disk surface and the related damage to the head and to the disk that would be caused by such contact. The head 13 is lifted (unloaded) from the disk or loaded onto the air film over the disk by ramp 15 which acts in conjunction with tang 17. When in the position shown by centerline 39, the tang 17 has unloaded the head from the disk. Tang 17 is held into the locked position by detent notch 19.

In order to overcome the restraining force presented by the tang 17 in detent 19, a significant driving force must be provided by voice coil motor 21. Once the tang 17 leaves the detent, it progresses across flat area 23 and down the slope 25 of ramp 15 with little accelerating force, and may pick up substantial velocity. At high velocity, the velocity component normal to the disk surface is significant, and may require a larger decelerating force than can be provided by the air film and, therefore, may hit the disk surface. For this reason, the velocity must be monitored and not allowed to rise too high, but also not be so slow that time is wasted during the load operation. Monitoring is accomplished by measuring the back EMF from voice coil 21 which is held to actuator arm 27 by coil support 29. Actuator arm 27 rotates on bearing 31. A head suspension 33 is fastened to arm 27 for suspending head 13 near the end of arm 27. The centerline 41 of arm 27 is also shown in a rest position 39, and in a maximum reading or recording position 43, to indicate the extent of travel of arm 27. Head 13 is connected to the read/write circuits by wire 35. Details of exemplary wiring are known in the art, and are not repeated here to avoid needlessly complicating the drawings.

Figure 2:
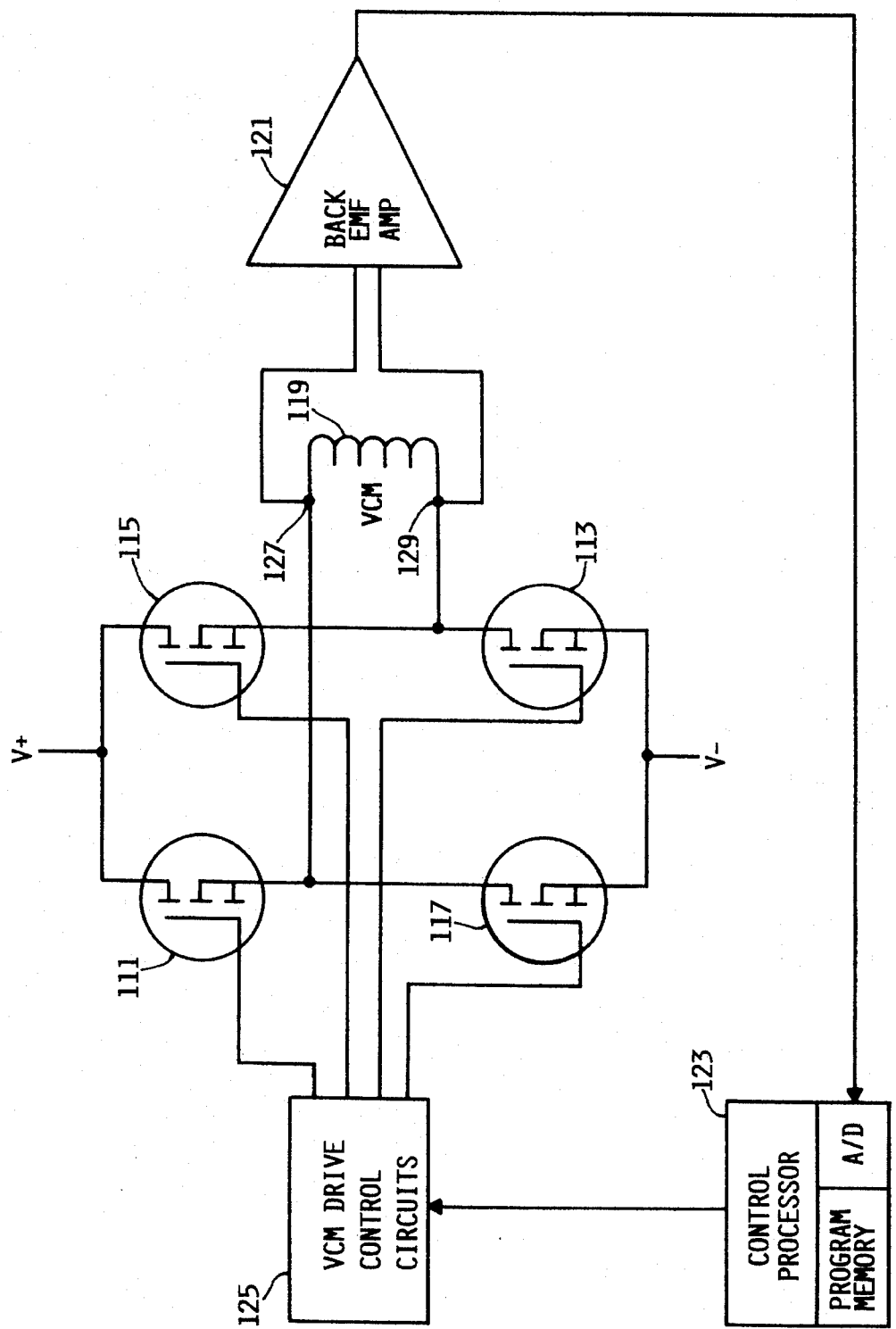
FIG. 2 is a diagram of the actuator drive circuits and control blocks in accordance with the invention.

FIG. 2 is a schematic diagram of the voice coil motor driving circuit and a block diagram of the control. The current is driven through the voice coil 119 by transistors pairs 111–113 to move the actuator arm in one direction, and by 115–117 to move the arm in the other direction. When transistors 111 and 113 are turned on, current flows from the positive terminal of the power supply, down through transistor 111, through the voice coil in a first direction from terminal 127 to terminal 129, and out through transistor 113 to the negative terminal of the power supply. When transistors 115 and 117 are turned on, current flows from the positive terminal of the power supply, down through transistor 115, through the voice coil in a second direction from terminal 129 to terminal 127, and out through transistor 117 to the negative terminal of the power supply. In this way, current can be made to flow in either direction through the voice coil, and move the actuator arm in either direction. When all four transistors 111–117 are driven such that the current in the coil decays to zero, no voltage drops occur across the coil due to resistance.

The only significant voltage across the coil 119 is due to the back EMF generated by motion of the coil through the field magnet of the motor. Although there may be some voltage due to leakage currents from the drive amplifiers, leakage voltage drop will be substantially compensated for by the referencing step mentioned later in conjunction with FIG. 4. This back EMF is proportional to the velocity of the motion of the arm. The EMF is amplified by amplifier 121, and fed to the control processor 123. Control processor 123 includes an analog to digital (A/D) converter for convening the analog amplified EMF from amplifier 121 to digital signals for processing according to programmed instructions in a program memory. When low EMF signals are present, the processor 123 determines that the arm 27 is moving at a low velocity, and processor 123 signals the drive circuits 125 to which processor 123 is connected to once again drive current through the coil 119 in the direction to increase the velocity of arm 27. After a calculated on-time of this drive current, the processor 123 again signals the drive circuits 125 to turn off the current to coil 119 so that a clear EMF signal can thereafter be measured, to thereby determine the velocity of arm 27 after the calculated on-time of the above-mentioned drive current. The circuits of FIG. 2 continue to operate, as described above, until a signal is received in the read head from the disk which indicates that the head has been loaded onto the disk. If the head is being unloaded from the disk, the current is driven through the voice coil in the opposite direction until the arm comes to rest in the detent 19 causing the EMF to go to zero.

OPERATION OF THE PREFERRED EMBODIMENT

Figure 3A:
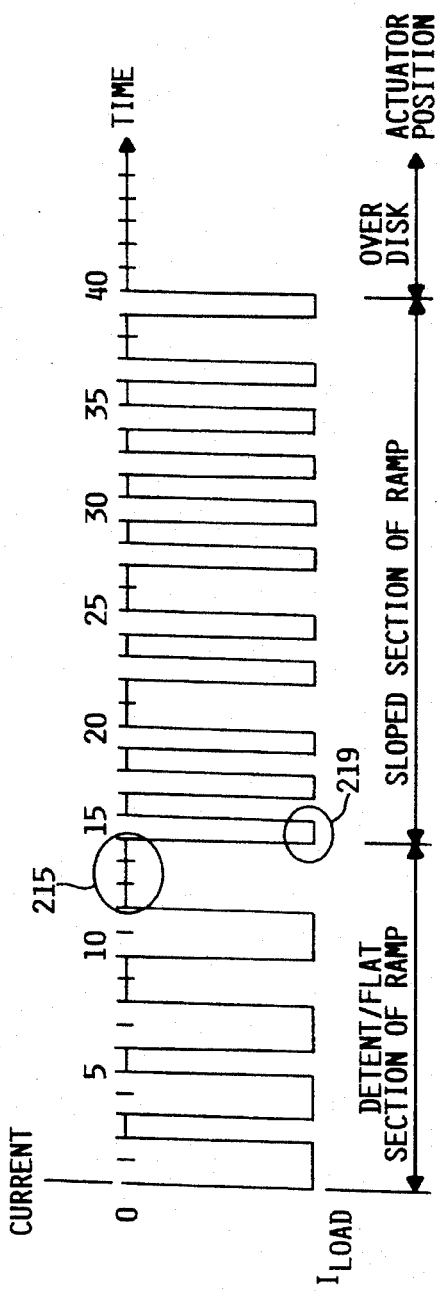
FIG. 3A shows the drive current waveform and FIG. 3B shows the back EMF waveform using discontinuous scales.
Figure 3B:
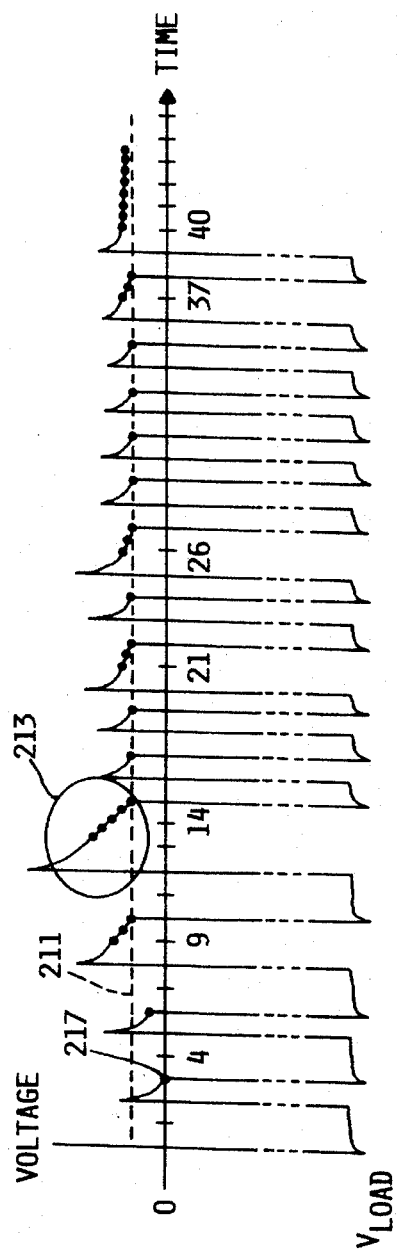

Referring now to FIG. 3, the drive current waveform is shown on top in FIG. 3A, and the combined drive voltage and back EMF wave form is shown below in FIG. 3B. These waveforms are generated by the control processor 123 using a simple threshold algorithm which will become clear as the waveform is explained. It will be apparent to one skilled in the art of moving media design that other more complicated load control algorithms may be employed without departing from the spirit and scope of the invention which is to measure the actuator arm velocity using back EMF induced into the low impedance voice coil at times when drive current is not being applied. Because the drive voltage is several orders of magnitude larger than the back EMF, the voltage scale of the lower waveform is broken in the middle. The top pans of the lower waveform are in the order of 50 millivolts per inch, whereas the lower parts of the waveform showing the drive voltage are in the order of 2.5 volts per inch. Voltage spikes are shown on each current pulse for realism. No attempt has been made to accurately show the magnitude and width of these spikes as they are not crucial to the invention, but are related to the impedance of the voice coil and to the particular circuitry chosen.

Likewise, the time scale has been slightly distorted to show examples of drive current pulses as the actuator arm assembly traverses the three areas of ramp 15. It will be recognized by those skilled in the art of moving media storage design that, in actual practice, more pulses of shorter duration, or fewer pulses of longer duration, may be provided in order to energize the actuator arm assembly at, or near, mechanical resonance frequencies to more easily overcome static friction of the bearing 31 and tang 17 of actuator arm 27 as it is being loaded onto the disk. It should be further recognized that although we employ current pulse width modulation to control energy being applied to the actuator arm, different pulse shaping methods, such as pulse amplitude modulation, as well as different voltages may be employed without departing from the principles of the invention.

The scale units marked on the time axis of FIGS. 3A and 3B are for purposes of explanation, and do not imply any regular increments of time. Actual pulse start and stop times depend upon changing variables, such as friction and impedance that make graphical presentation needlessly complex and, therefore, exact timing will not be attempted in these figures. The first drive current pulse, which starts at time zero and continues until time two of FIG. 3A, provides the torque at voice coil 21 to initiate movement of actuator arm 27 from it's rest position. This drive current pulse will be about five-hundred microseconds wide. At time two, the current is turned off and the current is allowed to decay for about 200 microseconds so that back EMF can be measured without interference by the drive current voltage drop. As seen in the top part of the lower waveform, the back EMF has not yet reached the threshold 211 and, in fact, goes to zero just as EMF is measured at sample 217. As soon as the EMF is measured and found to be below threshold 211, the next current pulse starts at time three. Zero EMF indicates that velocity also went to zero, but that the actuator arm has been moved out of the detent 19 and is on the flat section 23 of ramp 15. Accelerating torque is applied by voice coil 21 between times three and five resulting in a velocity and proportional back EMF that nearly reaches the threshold 211, and does not decay all the way to zero by time six when the EMF is again measured and used by the control processor to apply the third drive current pulse.

At the end of the third drive current pulse, the back EMF and the proportional velocity of the actuator arm 27 has exceeded threshold 211, and they remain above the threshold for two samples but they have already decayed to a level at or below the threshold 211 by the third sample which occurs at time ten. Accordingly another wide drive current pulse is provided beginning at time ten. This fourth pulse accelerates the arm 27 to a velocity indicated by the back EMF signal 213 to be well above the threshold 211 during zero current time 215, and the back EMF does not decay to or below the threshold until the fifth EMF sample is taken at time fifteen. This larger velocity decay time indicates that the EMF voltage was adequately above the threshold so as to allow the process to determine that such powerful wide current pulses are no longer needed to keep the arm moving at the target load velocity and the control processor hereafter applies shorter drive current pulses of about two hundred fifty microseconds as indicated at 219.

It will be noted that during these off times, eight to ten and twelve to fifteen, the back EMF decays rather fast, as indicated by the relatively steep slope of the decay of the back EMF. This phenomena is caused by the relatively higher friction of the tang 17 on the flat portion 23 of ramp 15. As the tang 17 passes the transition to the sloped section 25 of ramp 15, the back EMF decay becomes more gradual due to a reduced normal component of load force and, therefore, reduced friction, and in some cases a contribution of potential energy as the tang 17 goes down the slope 25.

Continuing at time fifteen, when the back EMF has now dropped to below the threshold 211, another drive current pulse is applied by control processor 123, but now a shorter pulse width is employed as the current turns off at time sixteen. This shorter pulse provides a shorter acceleration time and a lower end velocity at time sixteen. These steps are repeated between times seventeen and nineteen. The seventh drive current pulse in FIG. 3A has raised the velocity such that the back EMF does not decay to the threshold by time twenty-one and, therefore, more samples are taken until time twenty two.

The above-described process steps are repeated as the actuator arm moves the tang 17 down the slope of ramp 15 at a velocity that is controlled by the process to be near the threshold as measured by the back EMF. As the tang 17 leaves the slope 25 and the head begins to fly out over the disk, the tang to ramp component of friction disappears and, therefore, back EMF decay is much more gradual. Accordingly, at time forty, the back EMF is still above the threshold 211 when signals begin to be received from the read/write head 13, and actuator arm drive current control is accomplished using feedback from the disk media as is known in the prior art.

The unloading of the head from the disk media to the detent position is accomplished in a similar manner using a drive current of opposite polarity. Accordingly, the waveforms shown in FIGS. 3A and 3B will both be inverted during head unload from those shown, but the sequence of pulses will be very similar. Signals from the read/write head may be used to determine when the head has approached the ramp 15 shown in FIG. 1. Wide drive current pulses will then be applied, as described in conjunction with FIG. 5, and the tang will be driven up the slope 25 from the disk 11. After the tang 25 reaches the flat portion 19, friction is reduced, and drive pulses will be required less frequently to sustain a velocity above the unload velocity threshold. The unload velocity threshold may be significantly greater than the load velocity threshold. Unlike the waveform at time forty, however, when the tang reaches the detent position 19, velocity and back EMF abruptly go to substantially zero, and remain at nearly zero after the next drive current pulse. Several consecutive current pulses followed by near zero back EMF indicates to control processor 123 that the head has been unloaded. Additionally, although not shown in the flow diagram in FIG. 5, the method may terminate when a maximum number of drive pulses have been provided to the voice coil motor. Other more complex unload methods can also be used, such as using wide pulses to drive the arm up the ramp and narrow pulses thereafter, but we find that frequency modulation of wide pulses is adequate for unloading the head from the disk.

Figure 6:
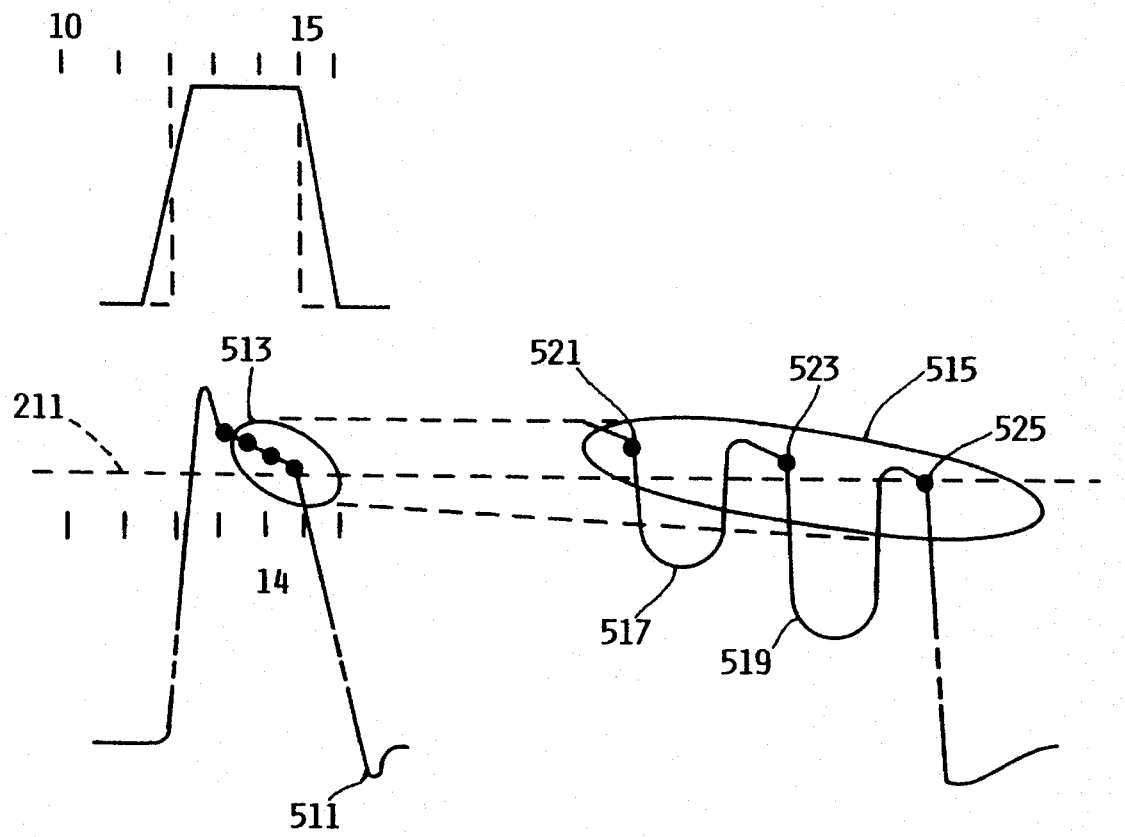
FIG. 6 is an expansion of a small portion of the drive current and back EMF waveforms of FIG. 3 in an alternate embodiment.

The readers attention is now directed to FIG. 6 where example alternate pulse shapes are disclosed. FIG. 6 is an expansion of the areas 213 and 215 of the waveforms of FIGS. 3B and 3A, respectively. As can be seen, a trapezoidal wave shape has been provided to reduce both acoustic and electrical high frequency noise generated by the drive currents. This is exemplified at 511 where the voltage spike is shown as wider, and of lower magnitude than appears in FIG. 3B. Providing slower turn off and turn on times reduces the number of back EMF voltage samples that can be taken.

The area 513 in FIG. 6 is shown on an expanded time scale in area 515 to permit the description of another alternative drive current algorithm. In 515, it can be seen that relatively lower values of voltage drop appear at 517 and 519 which are due to low values of sinusoidal current pulses being applied to the voice coil between samples 521, 523, and 525. At 521, an EMF significantly higher than threshold 211 exists and, accordingly, a small current 5 17 is applied. At 523, the EMF is nearly at the threshold so a larger amplitude current is applied at 519. These currents can be of the same polarity as the main drive current pulses as shown in FIG. 6 so they keep the velocity from decaying very fast. Alternately, they may be of opposite polarity and, therefore, tend to slow down the arm motion more quickly than it would normally decay. The rounded features of the extra current pulses reduce overshoot, and also raise the EMF voltage slightly at each sample. The currents 517 and 519 may be used, in addition to the main drive pulses as shown, and they may alternatively be used alone once the actuator reaches ramp 25 where there is low friction and velocity becomes more critical.

Figure 4:
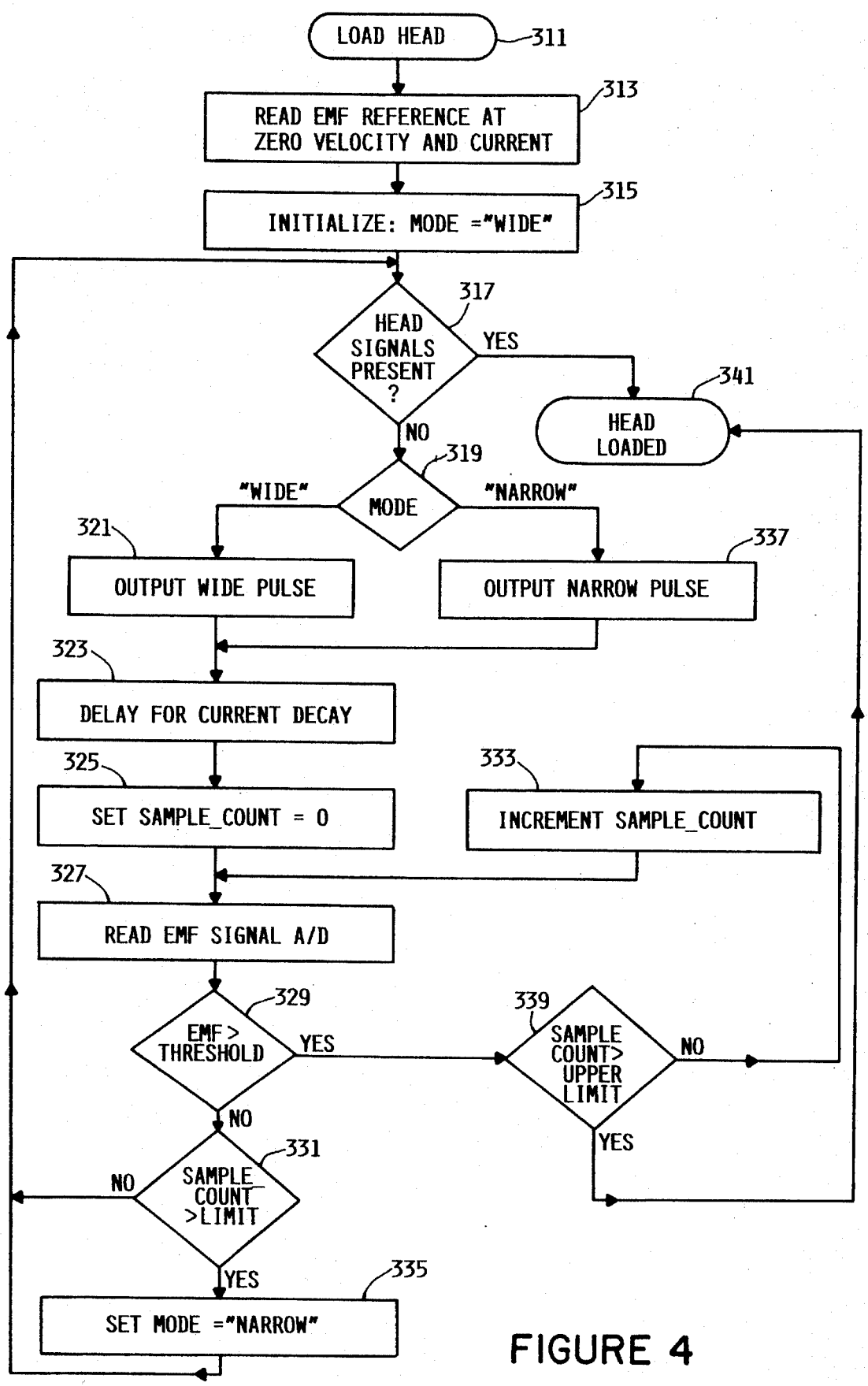
FIG. 4 is a flow diagram showing the method of programming the operation of a processor to provide the drive current pulses and sense EMF while loading the read/write head onto the disk.

Referring now to FIG. 4, a flow diagram is shown setting forth the method of the invention as depicted in the preferred embodiment of FIG. 3B. At block 311, a load head command initiates the method and, at block 313, the back EMF amplifier 121 of FIG. 2 is referenced to measure zero EMF when the head is still at rest and drive current has not yet been applied. At block 315, the mode is switched to wide drive current pulse mode. The head is tested at block 317 to determine if valid read signals are being received. Since the head has not yet been moved out over the disk, the decision will be NO, and the operation proceeds to block 319 where the wide pulse mode is recognized and a wide drive current pulse of approximately 500 microseconds is applied to the voice coil at block 321.

After the wide pulse has been applied and turned off, the processor waits for about two-hundred microseconds for the drive current to decay to substantially zero. A sample counter is then reset at block 325, and the first EMF sample is taken at block 327. If the EMF measured during the sample is found at block 329 to be less than the threshold required to meet the velocity threshold, the process moves to block 331 where the count that was reset at block 325 is found to be still equal to zero and, therefore, not greater than a limit value. The flow, therefore, returns to block 317 to determine if the head has been moved onto the disk and the process repeats.

For purpose of explanation, consider the process steps that occur during the off time labeled 215 in FIG. 3A. A wide pulse has been applied at block 321 between times ten and twelve, a two-hundred microsecond delay allows current decay and the sample counter is reset, as previously described. This time, the back EMF signal 213 is found at block 329 to be greater than the threshold 211 so the process moves to block 333 where the sample counter is incremented. The pack EMF is again sampled and found to be greater than the threshold, so the counter is again incremented. These steps are repeated four times until on the fifth sample, the EMF has dropped to the threshold and the flow proceeds to block 331. This time, a sample count of four was accumulated which is above the limit of three for our explanation. The greater than decision leads the process to block 335 where the mode is set to narrow drive current pulses, and the process returns to block 317.

On this next pass through the process, a narrow drive current pulse 219 is generated by block 337, and the operation continues. At some time after time forty, valid read signals will eventually be received from the read head, and block 317 will recognize that the head is loaded onto the disk. When signals begin to be received from the read write head 13, actuator arm drive current control is transferred to another process using feedback from the disk media, as is known in the prior art. If a very large sample count accumulates in the counter and signals are not received from the read head, the process goes directly to the head loaded block 341, as shown in FIG. 4 at block 339, because there may be a failure of the read signal circuits or other mechanical problems.

Figure 5:
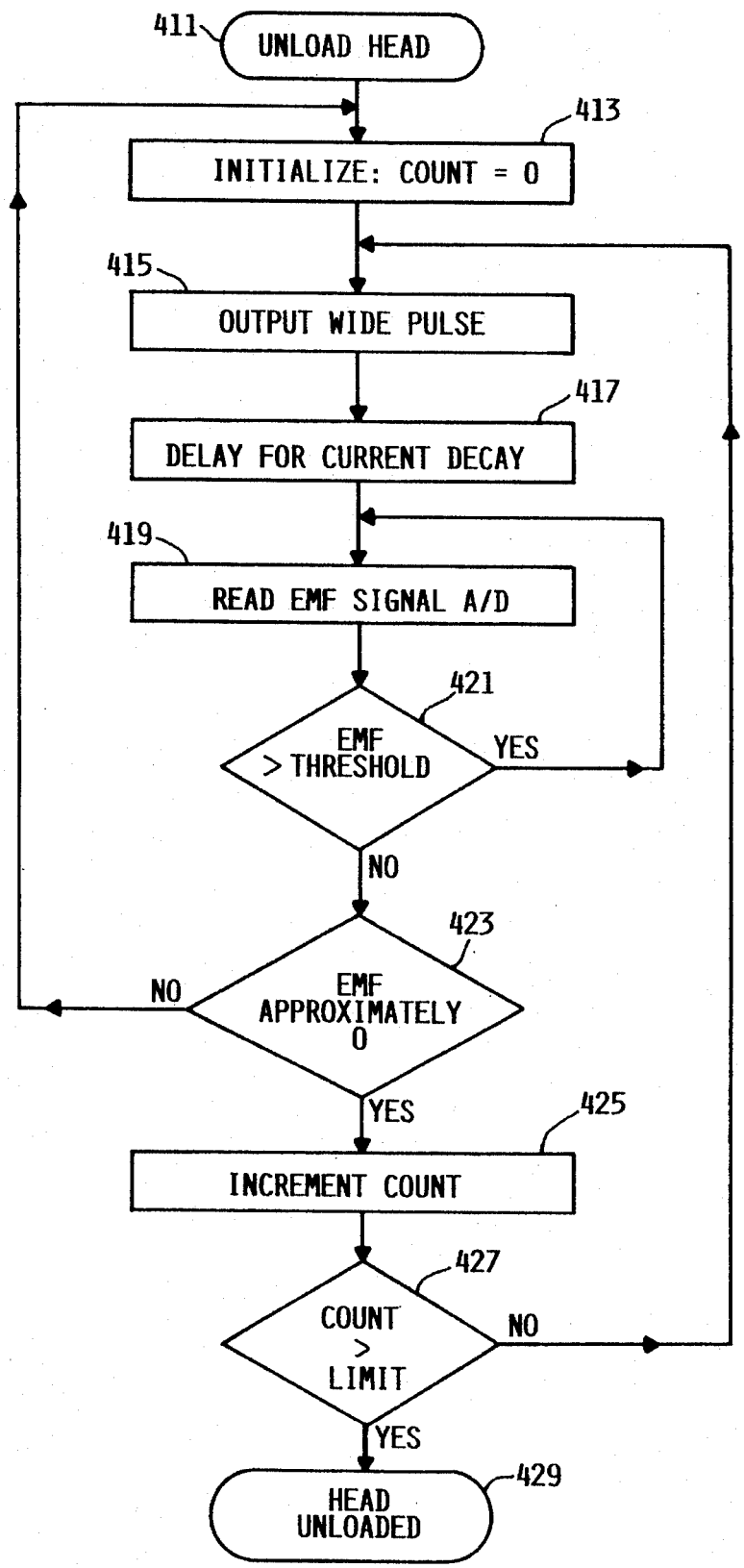
FIG. 5 is a flow diagram showing the method of programming the operation of a processor to provide the drive current pulses and sense EMF while unloading the read/write head from the disk.

The readers attention is now directed to FIG. 5 where an unload method is shown in a flow diagram. Signals from the head 13 are used by the processor 123 to control the motor drive circuits 125 to move the arm near to the outside edge of disk 11. At that point, an unload command 411 may be issued to initiate unloading of the head. After receiving the unload command, processor 123 initializes a count at block 413, and outputs a wide drive pulse at block 415. The process then waits for the drive current to decay at block 417 before reading the EMF signal analog-to-digital converter A/D at block 419. If the back EMF is found to be above the unload threshold at block 421, the method returns to block 419, and continues to sample the back EMF voltage until it decays to the threshold indicating the arm velocity has slowed to the unload velocity threshold. When the velocity drops below the threshold, the method returns to block 413 where the count is re-initialized, and another wide drive current pulse is provided. These steps repeat until the back EMF is detected to have gone to substantially zero at block 423. A zero-back EMF indicates that the tang 17 has reached stop 19. When the EMF goes to nearly zero, the count is incremented at block 425, and tested for a maximum at block 427 before the method returns to block 415 for another wide drive current pulse. After zero velocity is detected, the count is not re-initialized, but the method keeps driving the motor with the maximum number of wide pulses, as determined by the decision block 427 where the count is each time compared with the limit value. When the count reaches the limit, the head has been unloaded as determined in block 429.

As previously described, other more complex unload methods can also be used. We have found that using wide pulses to drive the arm up the ramp and narrow pulses thereafter may be a viable alternative, but that frequency modulation of wide pulses is adequate to control the velocity of the head while unloading the head from the disk. It also has the advantage of providing pulses of sufficient energy to avoid the problem that would occur if the tang 17 stuck on ramp 25 due to friction.

Having described the invention in terms of a preferred embodiment thereof, it will be recognized by those skilled in the art of computer peripheral equipment design that the various changes already suggested to the structure and programming of the implementations described, as well as others, can be made in the structure and programming of the implementations described without departing from the spirit and scope of the invention which is measured by the following claims.

What is claimed is:

1. A data storage device used in conjunction with a computer, comprising:

moving data storage media;

movable support means for supporting a data transducing head for movement relative to said data storage media;

actuator means for moving said support means, said actuator means having a current energizable coil that is movable with said support means;

back-EMF sensing means connected to said coil for sensing a coil-back-EMF voltage when said coil is not current-energized;

electrical drive means connected to said coil for supplying individual long-time-duration current pulses to said coil;

variable-time-interval delay means controlled by said back-EMF sensing means and operable to delay said supplying of a said individual long-time-duration current pulse to said coil for a variable-time-interval that is proportional to a time interval during which said coil-back-EMF voltage exceeds said predetermined threshold voltage; and means responsive to said variable-time-interval delay means for supplying individual short-time-duration current pulses to said coil when said proportional time interval exceeds a predetermined time-interval threshold.

2. The data storage device of claim 1 further comprising:

a stationary ramp that is physically engagable by said support means when said data transducing head is in an unloaded position relative to said data storage media;

wherein said electrical drive means supplies current pulses of a first electrical polarity to said coil when moving a data transducing head from said ramp and into a loaded position relative to said data storage media; and wherein said electrical drive means supplies current pulses of an opposite electrical polarity to said coil when moving said data transducing head onto said ramp and into said unloaded position relative to said data storage media.

3. A method of moving a data transducing head into and out of transducing position relative to a data storage media, comprising the steps of:

supplying a high energy current pulse to a movable drive coil, wherein movement of said coil operates to move an arm that holds said head;

delaying for a fixed time period during which said high energy current pulse decays to substantially zero;

sensing a back-EMF voltage of said coil after said fixed time period;

periodically repeating said sensing step until it is determined that said back-EMF voltage is not greater than a predetermined voltage threshold;

counting a number of times that said sensing step is repeated before it is determined that said back-EMF voltage is not greater than said predetermined voltage threshold;

when it is determined that said back-EMF voltage is not greater than said predetermined threshold voltage, repeating said high energy current pulse supplying step, said delaying step, said sensing step, and said counting step; and when during said counting step it is determined that said sensing step has been repeated a number of times that is greater than a predetermined count threshold, thereafter causing said supplying step to supply a low energy current pulse to said coil.

4. The method of claim 3 further comprising the steps of:

ceasing to repeat said method when a valid signal is received from said head indicating that said head has been loaded onto said media.

5. The method of claim 4 further comprising the steps of:

ceasing to repeat said current pulse supplying step, said delaying step, said sensing step, said repeating step, and said counting step when a valid signal has not been received from said head after said sensing step has been repeated a number of times greater than an upper limit while said back-EMF voltage remains above said predetermined voltage threshold.

6. In a data storage device having storage media, a data transducing head that is movable between an unloaded position and a loaded position relative to said media, a movable actuator arm on which said head is mounted, and an actuator arm drive coil that is operable to selectively effect movement of said actuator arm and said head in accordance with energy pulses that are supplied to said coil, a method of loading said head onto said media comprising the steps of:

A—supplying a high-energy pulse to said coil;

B—delaying for a first time interval after said supplying of said high-energy pulse;

C—measuring a coil back-EMF after said first time interval;

D—providing a first threshold back-EMF;

E—comparing said coil back-EMF to said first threshold back-EMF and determining a second time interval during which said coil back-EMF is greater than said first threshold back-EMF;

F—providing a first reference time interval;

G—comparing said second time interval to said first reference time interval;

H—when said second time interval is less than said first reference time interval, repeating said steps A, B, C, E and G; and I—when said second time interval is greater than said first reference time interval, supplying a low-energy pulse to said coil.

7. The method of claim 6 including the steps of:

J—delaying for a third time interval after said low-energy pulse;

K—measuring a coil back-EMF of said coil at the end of said third time interval;

L—comparing said coil back-EMF measured in step K to said threshold back-EMF and determining a fourth time interval during which said coil back-EMF is greater than said threshold back-EMF;

M—provide a second reference time interval;

N—comparing said fourth time interval to said second reference time interval;

O—when said fourth time interval is less than said second reference time interval, supplying a low-energy pulse to said coil and repeating said steps J, K, L and N; and P—when said fourth time interval is greater than said second reference time interval, terminating supply of energy pulses to said coil.

8. The method of claim 7 wherein said first and third time intervals of delay are about equal, and wherein said second reference time interval is greater than said first reference time interval.

9. The method of claim 8 including the steps of:

Q—monitoring said head for the presence of a valid read signal; and

R—upon determining the presence of said valid read signal, terminating supply of energy pulses to said coil.

* * * * *